US012080961B2

(12) United States Patent
Sekiya et al.

(10) Patent No.: US 12,080,961 B2
(45) Date of Patent: Sep. 3, 2024

(54) ANTENNA DEVICE

(71) Applicant: DENSO CORPORATION, Kariya (JP)

(72) Inventors: Youhei Sekiya, Nisshin (JP); Yuzi Sugimoto, Nisshin (JP); Masakazu Ikeda, Nisshin (JP); Yuuji Kakuya, Nisshin (JP); Ryuichi Arai, Kariya (JP); Shirou Koide, Kariya (JP); Takuya Yamashita, Kariya (JP); Hiroyuki Izumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 17/982,254

(22) Filed: Nov. 7, 2022

(65) Prior Publication Data

US 2023/0066781 A1 Mar. 2, 2023

Related U.S. Application Data

(63) Continuation of application No. PCT/JP2021/018111, filed on May 12, 2021.

(30) Foreign Application Priority Data

May 15, 2020 (JP) ................................ 2020-086016

(51) Int. Cl.
*H01Q 9/04* (2006.01)
*H01Q 21/06* (2006.01)
*H01Q 21/28* (2006.01)

(52) U.S. Cl.
CPC ........... *H01Q 9/0442* (2013.01); *H01Q 9/045* (2013.01); *H01Q 21/065* (2013.01)

(58) Field of Classification Search
CPC .... H01Q 1/3275; H01Q 21/28; H01Q 9/0407; H01Q 1/48; H01Q 1/246; H01Q 21/22; H01Q 21/24
See application file for complete search history.

(56) References Cited

U.S. PATENT DOCUMENTS

| | | | | |
|---|---|---|---|---|
| 2018/0198193 | A1 | 7/2018 | Wada et al. | |
| 2020/0412022 | A1* | 12/2020 | Yun | H01Q 21/08 |
| 2021/0151902 | A1* | 5/2021 | Sugimoto | H01Q 1/32 |

FOREIGN PATENT DOCUMENTS

| | | | |
|---|---|---|---|
| JP | H0537431 | A | 2/1993 |
| JP | 2008079345 | A | 4/2008 |
| JP | 2009124577 | A | 6/2009 |
| JP | 2017022497 | A | 1/2017 |
| WO | WO-2019160346 | A1 | 8/2019 |
| WO | WO-2020009114 | A1 | 1/2020 |

* cited by examiner

*Primary Examiner* — Wei (Victor) Y Chan
(74) *Attorney, Agent, or Firm* — Harness, Dickey & Pierce, P.L.C.

(57) ABSTRACT

An antenna device includes: a first antenna having a directional gain at a low elevation angle higher than the directional gain at a high elevation angle; a second antenna having the directional gain at the high elevation angle higher than the first antenna, transmitting and receiving a radio wave having a vibration direction of an electric field intersecting with a radio wave transmitted and received by the first antenna; and a third antenna having the directional gain at the high elevation angle higher than the first antenna, and transmitting and receiving a radio wave having a vibration direction of an electric field intersecting with the radio wave transmitted and received by the second antenna.

8 Claims, 5 Drawing Sheets

ANTENNA DEVICE

CROSS REFERENCE TO RELATED APPLICATION

The present application is a continuation application of International Patent Application No. PCT/JP2021/018111 filed on May 12, 2021, which designated the U.S. and claims the benefit of priority from Japanese Patent Application No. 2020-086016 filed on May 15, 2020. The entire disclosures of all of the above applications are incorporated herein by reference.

TECHNICAL FIELD

The present disclosure relates to an antenna device.

BACKGROUND

Antenna devices that transmit and receive a cross-polarization wave are known. A conceivable technique teaches an antenna configuration that realizes high-speed communication by using orthogonal polarization in the horizontal direction in a vehicle. One antenna is an antenna that transmits and receives horizontally polarized waves, and the other antenna is an antenna that transmits and receives vertically polarized waves. The antenna for transmitting and receiving horizontally polarized waves is an inverted L antenna, and the vertically polarized antenna is a monopole antenna.

SUMMARY

According to an example, an antenna device may include: a first antenna having a directional gain at a low elevation angle higher than the directional gain at a high elevation angle; a second antenna having the directional gain at the high elevation angle higher than the first antenna, transmitting and receiving a radio wave having a vibration direction of an electric field intersecting with a radio wave transmitted and received by the first antenna; and a third antenna having the directional gain at the high elevation angle higher than the first antenna, and transmitting and receiving a radio wave having a vibration direction of an electric field intersecting with the radio wave transmitted and received by the second antenna.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
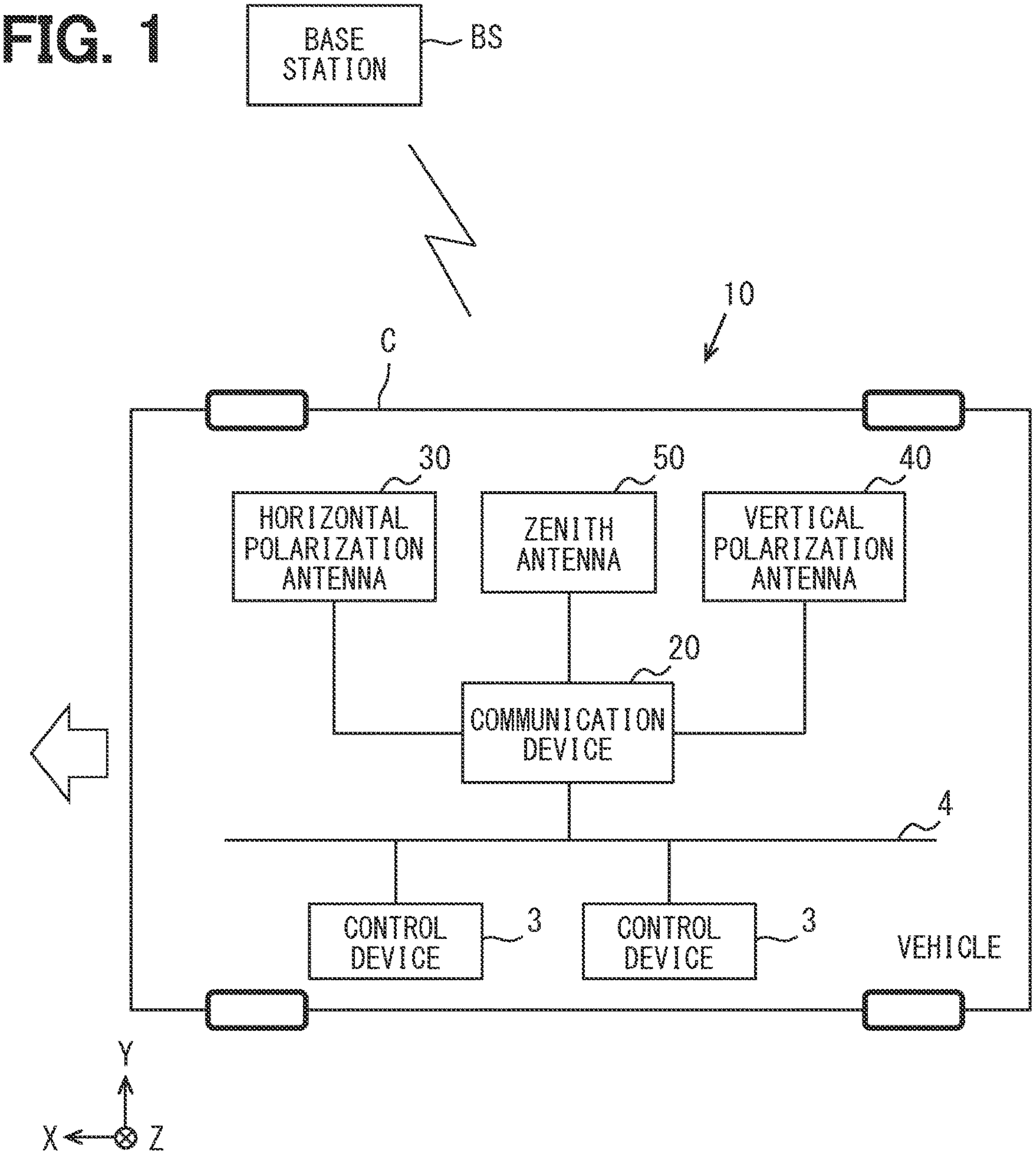
FIG. 1 is a diagram showing a configuration of the antenna device.

When the antenna device is mounted on the moving body, the movement of the moving body may cause a situation such that the base station is located at a high elevation angle when viewed from the antenna device. In the antenna configuration according to the conceivable technique, since the antenna for transmitting and receiving vertically polarized waves is a monopole antenna, the gain at a high elevation angle such as in the zenith direction is not sufficient. Therefore, in the antenna configuration according to the conceivable technique, when the base station is located at a high elevation angle, there is a possibility that direct wave communication cannot be performed satisfactorily.

Even if the base station is disposed at a high elevation angle, it is quite possible that some of the reflected waves that are reflected by various objects may also be reflected waves that come from a low elevation angle. Therefore, when the reflected wave can be received, the antenna device is likely to be able to communicate with the base station at the high elevation angle even if the gain at the high elevation angle is not sufficient.

However, when the frequency of the radio wave to be transmitted and received is in the millimeter wave band, the amount of attenuation according to the distance is large, so that it becomes difficult to receive the reflected wave. Therefore, when the frequency band of the radio waves to be transmitted and received is in the millimeter wave band, there is a particularly high possibility that good communication cannot be performed when the base station is located at a high elevation angle.

Further, even if the frequency of the radio wave transmitted/received is lower than that of the millimeter wave, it is the same as the millimeter wave in that the direct wave cannot be received. Therefore, even if the frequency of the radio waves transmitted and received is lower than the millimeter wave, when the base station is disposed at a high elevation angle, good communication may not be possible.

The present embodiments is based on this circumstance, and an object thereof is to provide an antenna device capable of good communication regardless of whether the base station is in a low elevation angle or a high elevation angle.

In order to achieve the above object, the embodiments provide an antenna device used in a mobile body includes:

- a first antenna having a directional gain at a low elevation angle higher than the directional gain at a high elevation angle;
- a second antenna having the directional gain at the high elevation angle higher than the first antenna, transmitting and receiving a radio wave having a vibration direction of an electric field intersecting with a radio wave transmitted and received by the first antenna, and communicable with a base station when the base station is disposed at the low elevation angle; and
- a third antenna having the directional gain at the high elevation angle higher than the first antenna, and transmitting and receiving a radio wave having a vibration direction of an electric field intersecting with the radio wave transmitted and received by the second antenna.

By using the first antenna and the second antenna, it is possible to increase the gain of communication due to cross-polarization with the base station at the low elevation angle. Further, by using the second antenna and the third antenna, it is possible to increase the gain of communication due to cross-polarization even with the base station at the high elevation angle. Therefore, even if the base station is disposed at the low elevation angle or the high elevation angle, good communication can be performed.

First Embodiment

The following will describe an embodiment of the present disclosure with reference to the drawings. FIG. 1 is a diagram showing an antenna device 10 according to a present embodiment. The antenna device 10 is mounted on a vehicle C. The vehicle C is an example of a moving body. The vehicle C travels on a road and is a four-wheeled passenger car in the present embodiment. Here, the antenna device 10 may be mounted on a vehicle C other than a four-wheeled passenger car, or may move together with a moving body other than the vehicle C.

The antenna device 10 is a device capable of communicating by a 5th generation mobile communication system (hereinafter, 5G). The frequency band of the radio wave used by the antenna device 10 for communication includes a millimeter wave band, for example, a 28 GHz band. The antenna device 10 includes a communication device 20, a horizontal polarization antenna 30, a vertical polarization antenna 40, and a zenith antenna 50. The horizontal polarization antenna 30 corresponds to the second antenna, the vertical polarization antenna 40 corresponds to the first antenna, and the zenith antenna 50 corresponds to the third antenna.

The communication device 20 transmits and receives signals by radio waves to and from the base station BS outside the vehicle C via the horizontal polarization antenna 30, the vertical polarization antenna 40, and the zenith antenna 50. Although only one base station BS is shown in FIG. 1 for convenience of illustration, there are a plurality of base station BSs. The ground height in which a plurality of base station BSs are disposed varies.

Specific operations of the communication device 20 include amplification and modulation of signals transmitted from the antennas 30, 40 and 50, demodulation and amplification of radio waves received by the antennas 30, 40 and 50. The communication device 20 is capable of mutual communication by various control devices 3 mounted on the vehicle C and an in-vehicle LAN 4.

The horizontal polarization antenna 30 is an antenna that transmits and receives horizontally polarized waves. Horizontally polarized waves are radio waves whose vibration direction is horizontal to the ground. The vertical polarization antenna 40 is an antenna that transmits and receives vertically polarized waves. Vertically polarized waves are radio waves whose vibration direction is perpendicular to the ground. The zenith antenna 50 is an antenna having a high directional gain in the zenith direction.

Figure 2:
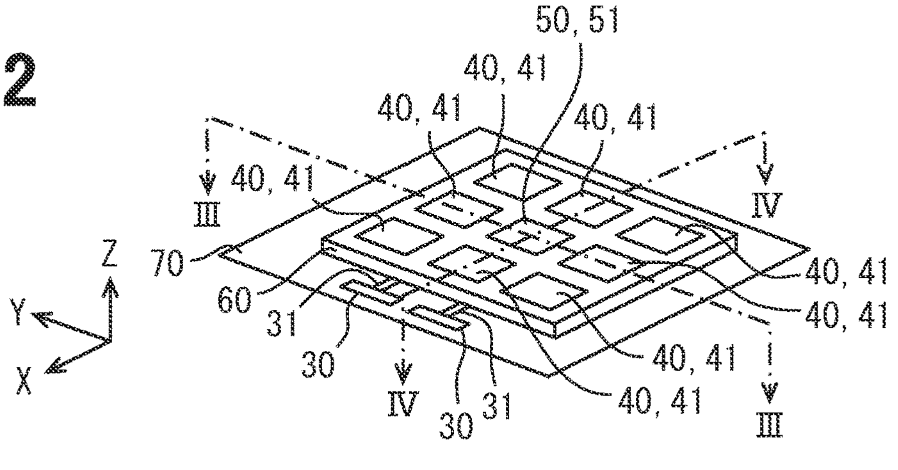
FIG. 2 is a diagram showing a specific configuration of antennas.

FIG. 2 shows a specific configuration of the antennas 30, 40, and 50 included in the antenna device 10. In the present embodiment, the horizontal polarization antenna 30, the vertical polarization antenna 40, and the zenith antenna 50 are arranged on one substrate 60. The substrate 60 is made of a dielectric material such as glass epoxy resin. In the present embodiment, the shape of the substrate 60 is a rectangular flat plate. The installation position of the substrate 60 is on the roof of the vehicle C, and the board 60 is covered with a cover and installed on the roof. Alternatively, a part of the roof may be recessed and the substrate 60 may be fitted therein. The arrangement of the substrate 60 is a posture along the roof. The substrate 60 is installed at a predetermined installation position such as a roof via the dielectric sheet 70.

The horizontal polarization antenna 30 is connected to the substrate 60 by a power supply line 31 extending from one side of the substrate 60, specifically, a side of the substrate 60 on the front side of the vehicle C. The horizontal polarization antenna 30 is a dipole antenna and extends in the vehicle width direction. A dipole antenna is an example of a rod-shaped antenna.

Since the horizontal polarization antenna 30 is a dipole antenna, the length is about $\lambda/2$ (that is, about half a wavelength). Note that $\lambda$ represents the wavelength of the radio wave to be transmitted and received. Further, two horizontal polarization antennas 30 having the same shape are arranged along the vehicle width direction. The number of horizontal polarization antennas 30 is an example. The number of horizontal polarization antennas 30 may be one or three or more.

Eight vertical polarization antennas 40 having the same shape are provided on the substrate 60. Each vertical polarization antenna 40 includes a conductor plate 41 shown in FIG. 2. In the present embodiment, the plate includes a thin foil-like plate, and the conductor plate 41 is made of a conductor such as copper foil. The shape of the conductor plate 41 is a flat plate, and the planar shape is a square. The eight vertical polarization antennas 40 are arranged at equal intervals so as to form a square along the four sides of the substrate 60. The zenith antenna 50 is arranged at a position surrounded by the eight vertical polarization antennas 40. The zenith antenna 50 includes a conductor plate 51 shown in FIG. 2.

Figure 3:
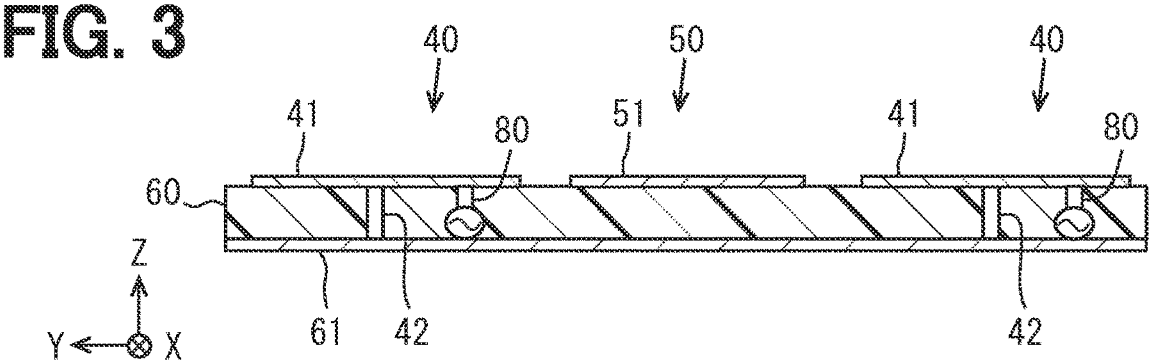
FIG. 3 is a diagram showing a cross sectional view taken along a line III-III in FIG. 2.

FIG. 3 illustrates a sectional view taken along line III-III of FIG. 2. Note that the dielectric sheet 70 is omitted in FIG. 3. The vertical polarization antenna 40 includes a short-circuit pin 42 that penetrates the conductor plate 41 arranged on the upper surface of the substrate 60, the ground 61 arranged on the back surface of the substrate 60, and the substrate 60 in the thickness direction, and electrically connects the conductor plate 41 and the ground 61. The short-circuit pin 42 is connected to the conductor plate 41 at the center of the conductor plate 41. The short-circuit pin 42 can be realized by a via provided on the substrate 60.

The power supply line 80 is connected to the conductor plate 41, and the electric power is supplied from the power supply line 80. The ground 61 is formed on the entire back surface of the substrate 60, and the ground 61 is common to all the vertical polarization antennas 40 and the zenith antenna 50.

Figure 4:
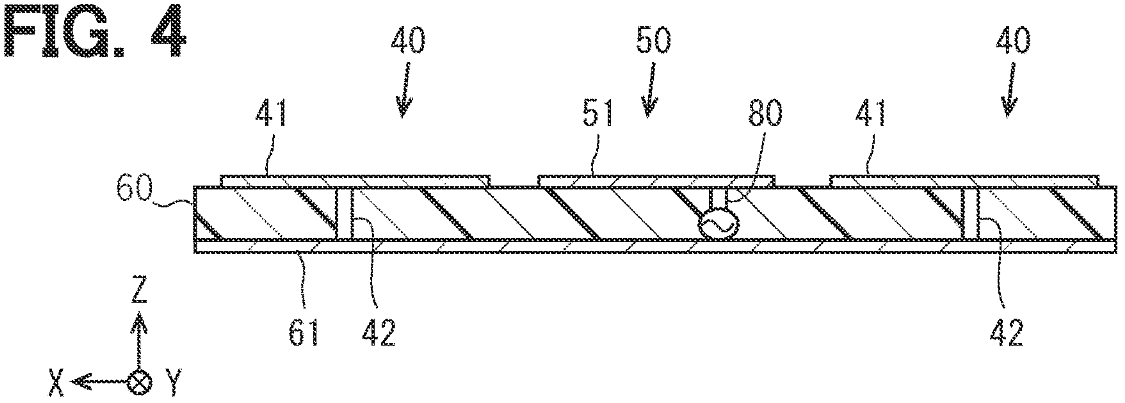
FIG. 4 is a cross-sectional view taken along line IV-IV of FIG. 2.

FIG. 4 shows a sectional view taken along line IV-IV of FIG. 2. Note that the dielectric sheet 70 is omitted in FIG. 4. The zenith antenna 50 is a patch antenna, and the power supply line 80 is connected to the conductor plate 51. The conductor plate 51 has a planar shape of a square shape having a side length of $\lambda/2$. The position where the power supply line 80 is connected in the conductor plate 51 is a position on the rear side in the conductor plate 51 in the front-rear direction of the vehicle.

Figure 5:
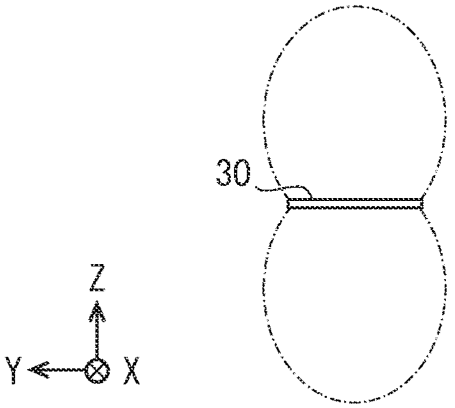
FIG. 5 is a diagram illustrating a directional gain of the horizontal polarization antenna.
Figure 6:
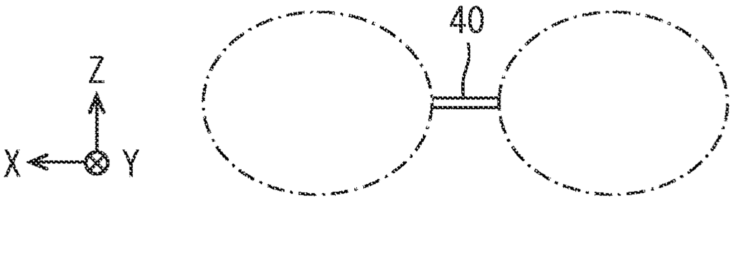
FIG. 6 is a diagram illustrating the directional gain of the vertical polarization antenna.
Figure 7:
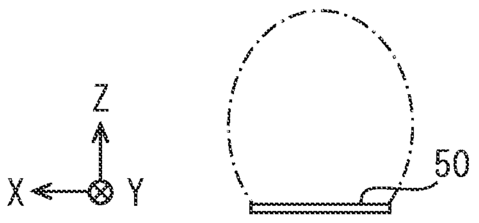
FIG. 7 is a diagram illustrating a directional gain of the zenith antenna.

FIGS. 5, 6 and 7 show the directional gains of the horizontal polarization antenna 30, the vertical polarization antenna 40, and the zenith antenna 50, respectively. In FIGS. 5, 6 and 7, the alternate long and short dash line indicates the directional gain. The actual directivity gain shows a complicated shape due to the influence of surrounding objects and the like. The directional gains shown in FIGS. 5, 6 and 7 are ideal gains. In the following description, the vehicle front-rear direction may be referred to as the X-axis direction, the vehicle width direction may be referred to as the Y-axis direction, and the vertical direction may be referred to as the Z-axis direction. Each of these axes is also shown in FIGS. 1-7.

Since the horizontal polarization antenna 30 is a dipole antenna and the antenna element extends in the Y-axis direction, the linearly polarized waves radiated by the horizontal polarization antenna 30 vibrate in the Y-axis direction in the horizontal plane. Further, since the horizontal polarization antenna 30 is a dipole antenna, the directivity around the axis of the antenna is isotropically high. Therefore, as shown in FIG. 5, the directivity gain in the X-axis direction is also high. Therefore, the horizontal polarization antenna 30 is an antenna that can communicate with the base station BS when the base station BS is disposed at a low elevation angle. Further, since the horizontal polarization antenna 30 has high directivity around the axis of the antenna, the directivity gain in the Z-axis direction is also high. Therefore, the horizontal polarization antenna 30 can communicate with the base station BS even if the base station BS is disposed at a high elevation angle. However, the directional gain in the Y-axis direction in which the horizontal polarization antenna 30 extends is low.

The vertical polarization antenna 40 is a zeroth order resonant antenna. The principle that the vertical polarization antenna 40 operates as an antenna by the 0th order resonance will be outlined. The area of the conductor plate 41 is an area that forms a capacitance that resonates in parallel with the inductance of the short-circuit pin 42 at the frequency of radio waves transmitted and received by the vertical polarization antenna 40 (hereinafter, operating frequency). Therefore, in the operating frequency and its vicinity, parallel resonance (so-called LC parallel resonance) occurs due to energy exchange between the inductance and the capacitance. Due to this parallel resonance, an electric field perpendicular to the ground 61 and the conductor plate 41 (hereinafter referred to as a vertical electric field) is generated between the ground 61 and the conductor plate 41. The operating frequency may be adjusted by using a matching element.

This vertical electric field propagates from the short-circuit pin 42 toward the edge of the conductor plate 41, and at the edge of the conductor plate 41, the polarization wave becomes perpendicular to the conductor plate 41 (hence, the perpendicular polarization wave) and propagates through space. Since the radio waves transmitted and received by the vertical polarization antenna 40 are vertically polarized and the radio waves transmitted and received by the horizontal polarization antenna 30 are horizontally polarized, the electric fields of the radio waves transmitted and received by the horizontal polarization antenna 30 and the vertical polarization antenna 40 have the vibration directions crossed to each other, more specifically orthogonal to each other.

Since the radio waves radiated from the vertical polarization antenna 40 are radiated from each edge of the conductor plate 41 into the space, when the ground 61 is arranged so as to be horizontal, the radiation direction of the vertical polarization antenna 40 is, X-axis direction and Y-axis direction as shown in FIG. 6. The propagation direction of the vertical electric field is symmetric about the short-circuit pin 42 as a center. Therefore, the radiation characteristic in the direction parallel to the ground 61 is omnidirectional (in other words, all-directional). Therefore, the vertical polarization antenna 40 can satisfactorily communicate with the base station BS regardless of the orientation of the base station BS when the base station BS is disposed at a low elevation angle. The low elevation angle means an elevation angle that is so low that the directivity gain of the zenith antenna 50 described below becomes low.

Here, since the short-circuit pin 42 is arranged at the center of the conductor plate 41, the current flowing through the conductor plate 41 is symmetrical with respect to the short-circuit pin 42 as a center. Therefore, a radio wave in the antenna height direction generated by a current that flows through the conductor plate 41 in a certain direction from the center of the conductor plate 41 is canceled by a radio wave generated by the current that flows in the opposite direction. That is, the current excited by the conductor plate 41 does not contribute to the emission of radio waves. Therefore, the vertical polarization antenna 40 does not radiate radio waves in the direction perpendicular to the conductor plate 41, that is, in the zenith direction.

Since the zenith antenna 50 is a patch antenna, it radiates radio waves in the Z-axis direction, that is, in the zenith direction, as shown in FIG. 7. Further, in the zenith antenna 50, since the power supply line 80 is connected to the conductor plate 51 at a position deviated from the center in the X-axis direction, the linear polarization wave radiated by the zenith antenna 50 vibrates in the X-axis direction.

The vibration direction of the electric field of the radio wave transmitted and received by the horizontal polarization antenna 30 is the Y-axis direction in the XY plane, whereas the vibration direction of the electric field of the radio wave transmitted and received by the zenith antenna 50 is the X axis direction in the XZ plane. Therefore, the vibration direction of the electric field of the radio wave transmitted and received by the zenith antenna 50 intersects with the vibration direction of the electric field of the radio wave transmitted and received by the horizontal polarization antenna 30, and more specifically, is orthogonal thereto.

Summary of First Embodiment

According to the antenna device 10 of the first embodiment, the horizontal polarization antenna 30 and the vertical polarization antenna 40 can communicate with the base station BS at a low elevation angle, and the vibration directions of the electric fields of the radio waves transmitted and received by the horizontal polarization antenna 30 and the vertical polarization antenna 40 intersect each other. Therefore, the antenna device 10 can communicate with the base station BS at a low elevation angle by two polarization waves intersecting each other.

Further, the horizontal polarization antenna 30 has a high directional gain at a high elevation angle, and the antenna device 10 includes a zenith antenna 50 having a high directional gain at a high elevation angle. The vibration directions of the electric fields of the radio waves transmitted and received by the horizontal polarization antenna 30 and the zenith antenna 50 are orthogonal to each other. Therefore, even when the base station BS is disposed at a high elevation angle, the antenna device 10 can satisfactorily communicate with the base station BS by a direct wave with two polarization waves intersecting each other. Since the communication is performed by the direct wave, it is possible to satisfactorily communicate with the base station BS even in the 5G communication using the millimeter wave band.

Further, in the present embodiment, the vertical polarization antenna 40 which is a 0th-order resonance antenna and the zenith antenna 50 which is a patch antenna are arranged on the same substrate 60. That is, the vertical polarization antenna 40 and the zenith antenna 50 are arranged on the same layer. Since the vertical polarization antenna 40 and the zenith antenna 50 are arranged on the same layer, the side lobes of the radio waves radiated by the zenith antenna 50 are reflected by the vertical polarization antenna 40. As a result, the zenith antenna 50 reduces radiation in unnecessary directions, so that the directivity gain in the zenith direction is improved.

Further, not only the zenith antenna 50 is arranged on the same layer as the vertical polarization antenna 40, but also the zenith antenna 50 is sandwiched between the vertical polarization antennas 40 on the same substrate 60. With such an arrangement, the zenith antenna 50 can further suppress the sidelobes, so that the directivity gain in the zenith direction is further improved. Note that being sandwiched means that the zenith antenna 50 is disposed on a line segment connecting the two vertical polarization antennas 40.

Further, in the present embodiment, the horizontal polarization antenna 30, the vertical polarization antenna 40, and the zenith antenna 50 are arranged on the same substrate 60. Since the vibration directions of the electric fields of these three antennas 30, 40, and 50 intersect each other, even if these antennas 30, 40, and 50 are arranged on the same substrate 60, the interference of radio waves can be suppressed. Therefore, it is possible to suppress deterioration of communication performance while reducing the size of the antenna device 10.

Second Embodiment

Next, a second embodiment will be described. In the following description of the second embodiment, elements having the same reference numerals as those used so far are the same as the elements having the same reference numerals in the previous embodiment, except when specifically mentioned. When only a part of the configuration is described, the embodiment described above can be applied to other parts of the configuration.

Figure 8:
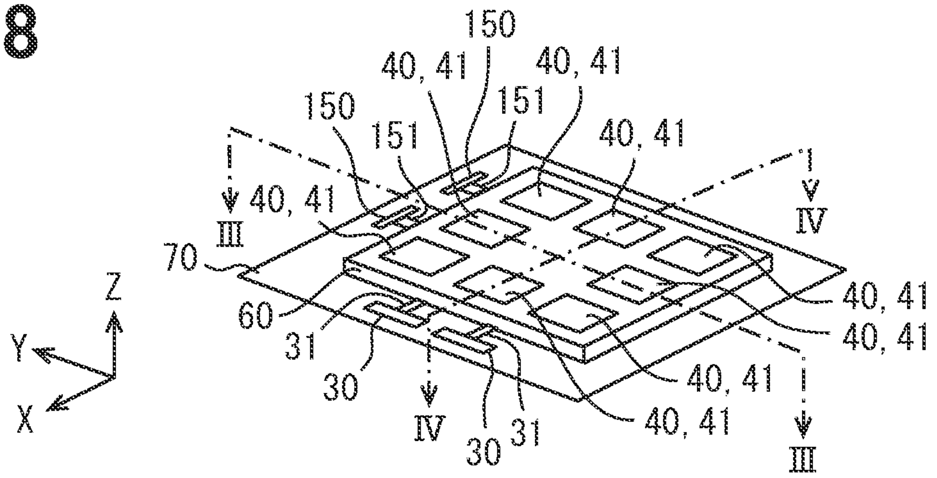
FIG. 8 is a diagram showing a configuration of an antenna according to a second embodiment.

FIG. 8 is a diagram showing a configuration of an antenna according to a second embodiment. The second embodiment provides the same horizontal polarization antenna 30 and vertical polarization antenna 40 as in the first embodiment. On the other hand, the zenith antenna 50 is not provided, and instead, two horizontal polarization antennas 150 are provided as the third antenna. The number of horizontal polarization antennas 150 is an example, and may be one or a plurality of three or more.

The horizontal polarization antenna 150 is connected to the substrate 60 by a power supply line 151. The horizontal polarization antenna 150 is a dipole antenna having the same shape as the horizontal polarization antenna 30. Here, the arranged position and orientation are different from those of the horizontal polarization antenna 30.

The position where the horizontal polarization antenna 150 is arranged is a side of the substrate 60 orthogonal to the side to which the horizontal polarization antenna 30 is connected on the substrate 60. The horizontal polarization antenna 150 is arranged parallel to this side. Therefore, the horizontal polarization antenna 150 is orthogonal to the horizontal polarization antenna 30 in the same plane.

Figure 9:
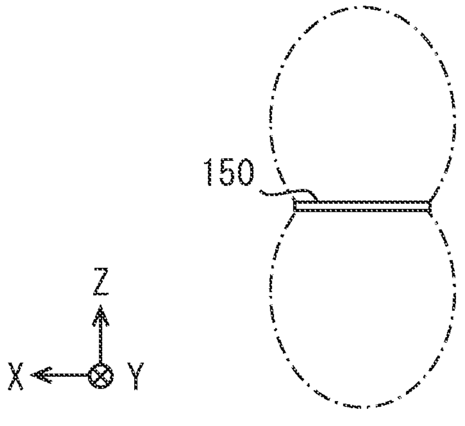
FIG. 9 is a diagram showing the directional gain of the horizontal polarization antenna.

Due to such an arrangement, the vibration direction of the electric field of the radio wave transmitted and received by the horizontal polarization antenna 150 is the X-axis direction in the XY plane. Further, as shown in FIG. 9, the directivity gain of the horizontal polarization antenna 150 has a high directivity gain in the Z-axis direction. Therefore, when the base station BS disposed is at a high elevation angle, the horizontal polarization antenna 150 can communicate with the base station BS. Further, the horizontal polarization antenna 150 has a high directional gain in the Y-axis direction.

If the base station BS is disposed at a low elevation angle in the Y-axis direction, good communication can be performed using the horizontal polarization antenna 150. Here, the Y direction is not the traveling direction of the vehicle C. Therefore, when there is a base station BS at a low elevation angle in front of the vehicle C, which is highly necessary to communicate when the vehicle C is traveling, and the vehicle C communicates with the base station BS by cross polarization, it may be preferable that the horizontal polarization antenna 30 and the vertical polarization antenna 40 are used.

If the base station BS in front of the vehicle C is installed at a high position from the road, the base station BS may be located at a high elevation angle when viewed from the vehicle C as the vehicle C approaches the base station BS. The vibration direction of the electric field of the radio wave transmitted and received by the horizontal polarization antenna 30 and the vibration direction of the electric field of the radio wave transmitted and received by the horizontal polarization antenna 150 are common in that they are in the XY plane. Therefore, when the base station BS exists in the horizontal direction with respect to the vehicle C, the radio waves transmitted and received by these two antennas 30 and 150 cannot be regarded as cross-polarized waves.

However, the vibration direction of the electric field of the radio wave transmitted and received by the horizontal polarization antenna 30 is in the Y-axis direction, whereas the vibration direction of the electric field of the radio wave transmitted and received by the horizontal polarization antenna 150 is in the X-axis direction. When communicating with the base station BS at a high elevation angle, the direction in which the base station BS and the antenna device 10 transmit and receive radio waves is a direction intersecting the horizontal plane. In this direction, the radio waves transmitted and received by the horizontal polarization antenna 30 and the radio waves transmitted and received by the horizontal polarization antenna 150 can be regarded as cross-polarized waves. Therefore, in the second embodiment, the horizontal polarization antenna 30 and the horizontal polarization antenna 150 can be used when communicating with the base station BS at a high elevation angle by cross-polarization.

Third Embodiment

Figure 10:
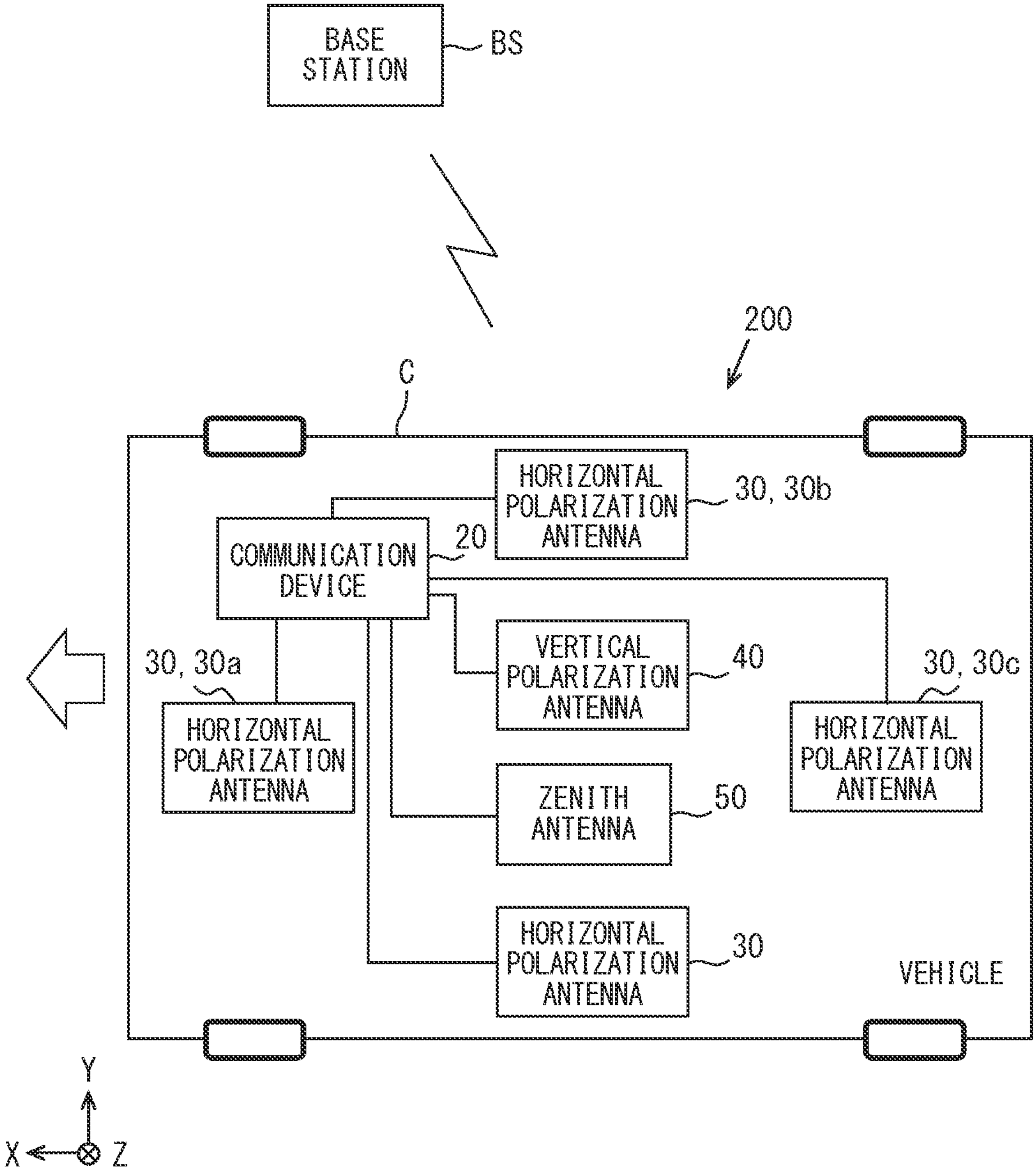
FIG. 10 shows a configuration of an antenna device according to the third embodiment.

FIG. 10 shows a configuration of an antenna device 200 according to the third embodiment. The antenna device 200 includes the same communication device 20, a horizontal polarization antenna 30, a vertical polarization antenna 40, and a zenith antenna 50 as in the first embodiment. Here, the number and position of the horizontal polarization antennas 30 are different from those of the antenna device 10 of the first embodiment. As in the first embodiment, the vehicle C includes an in-vehicle LAN 4 and a control device 3, but these are not shown.

The antenna device 200 includes horizontal polarization antennas 30*a*, 30*b*, 30*c*, and 30*d* as the horizontal polarization antenna 30. Each of these horizontal polarization antennas 30*a*, 30*b*, 30*c*, and 30*d* may be a single dipole antenna or an array antenna including a plurality of dipole antennas.

The horizontal polarization antenna 30*a* is arranged at the center of the front portion of the vehicle C in the vehicle width direction. The horizontal polarization antenna 30*b* is arranged at the center of the vehicle C in the front-rear direction at the right end of the vehicle C. The horizontal polarization antenna 30*c* is arranged at the rear of the vehicle C at the center in the vehicle width direction. The horizontal polarization antenna 30*d* is arranged at the center of the left end of the vehicle in the front-rear direction of the vehicle. The vertical polarization antenna 40 and the zenith antenna 50 are arranged at the center in the vehicle width direction on the roof of the vehicle C. Due to such an arrangement, naturally, the horizontal polarization antenna 30*a* and the horizontal polarization antenna 30*c* are separated by λ/2 or more in the front-rear direction of the vehicle C, and the horizontal polarization antenna 30*b* and the horizontal polarization antenna 30*d* are separated from each other by λ/2 or more in the width direction of the vehicle C.

The horizontal polarization antennas 30*a*, 30*b*, 30*c*, and 30*d* are arranged in such a distributed manner. Therefore, it is suppressed that the radio wave transmitted by any of the horizontal polarization antennas 30*a*, 30*b*, 30*c*, and 30*d* interferes with the radio waves transmitted and received by the other horizontal polarization antennas 30*a*, 30*b*, 30*c*, and 30*d*.

Fourth Embodiment

Figure 11:
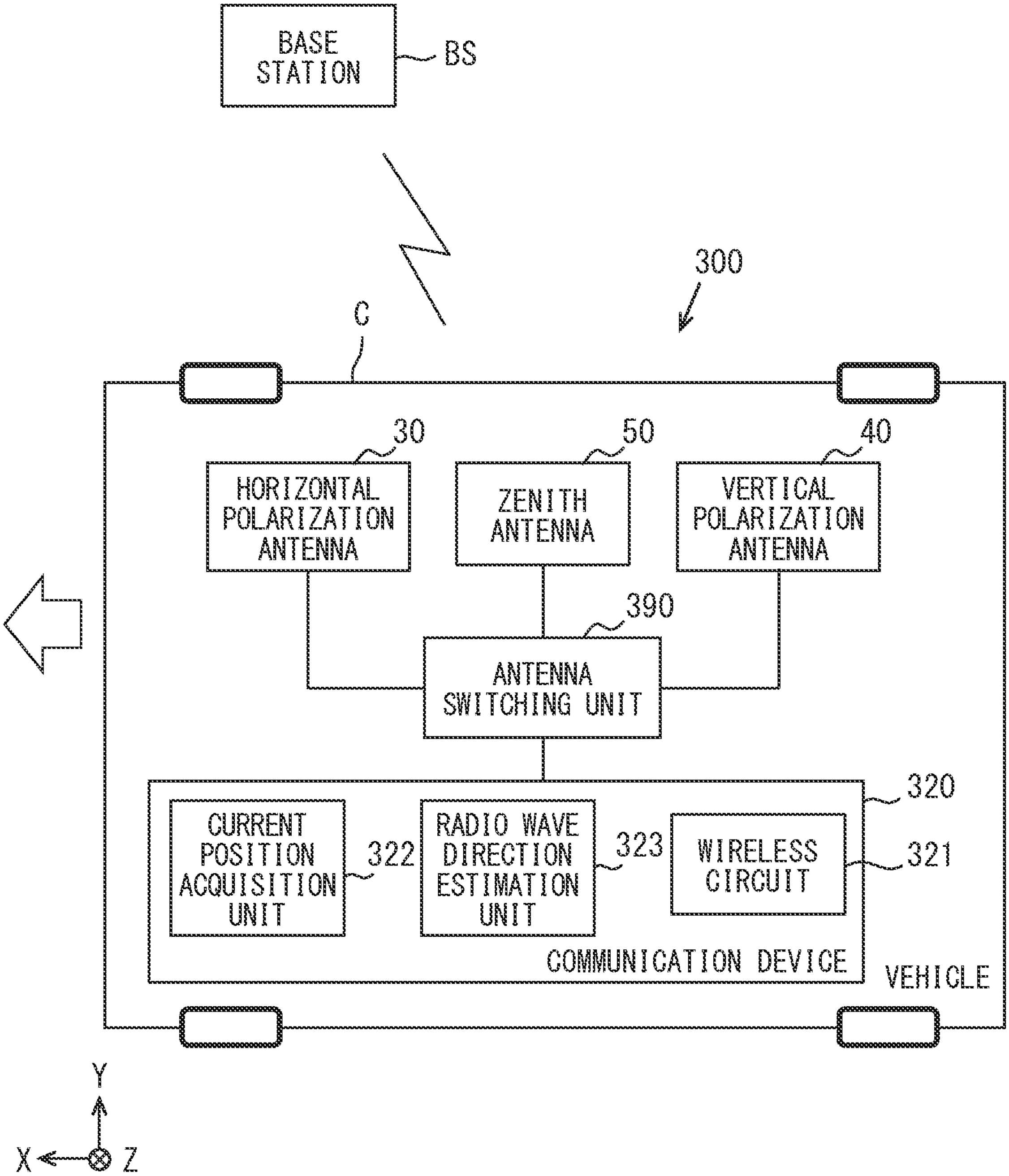
FIG. 11 shows a configuration of an antenna device according to the fourth embodiment.

FIG. 11 shows a configuration of an antenna device 300 according to the fourth embodiment. Also in FIG. 11, the in-vehicle LAN 4 and the control device 3 are not shown. The antenna device 300 includes the same horizontal polarization antenna 30, vertical polarization antenna 40, and zenith antenna 50 as in the first embodiment.

The communication device 320 includes a wireless circuit 321, a current position acquisition unit 322, and a radio wave direction estimation unit 323. The wireless circuit 321 has the same function as the communication device 20 of the first embodiment, and is connected to the base station BS outside the vehicle C via the horizontal polarization antenna 30, the vertical polarization antenna 40, and the zenith antenna 50 to send and receive signals by radio waves between them.

The current position acquisition unit 322 acquires the current position of the antenna device 300. The current position of the vehicle C can be used for this current position. When another device mounted on the vehicle C sequentially determines the current position, the current position acquisition unit 322 acquires the current position from the other device. Further, the current position acquisition unit 322 may include a GNSS receiver, and the current position acquisition unit 322 may determine the current position. The current position acquisition unit 322 acquires the current position in the form of three-dimensional coordinates.

The radio wave direction estimation unit 323 estimates whether the elevation angle at which the radio wave from the base station BS arrives is in the low elevation angle range or the high elevation angle range. The elevation angle range larger than the boundary elevation angle determined in advance is defined as the high elevation range, and the elevation angle range below the boundary elevation angle is defined as the low elevation range. The boundary elevation angle is the lower limit of the angle range in which communication using the zenith antenna 50 has a higher gain than the vertical polarization antenna 40. The radio wave direction estimation unit 323 may estimate the orientation angle in addition to the elevation angle.

The radio wave direction estimation unit 323 can be realized, for example, by a computer equipped with a processor executing a program created for radio wave direction estimation. This program is stored in a non-volatile memory provided in the computer.

Next, the method of the radio wave direction estimation unit 323 for estimating the elevation angle at which the radio wave arrives will be explained as follows. In the present embodiment, the base station BS provides a signal indicating a position where the base station BS is installed (hereinafter referred to as a base station position) in the radio wave to be transmitted. The base station position is expressed in three-dimensional coordinates. The base station position is stored in a storage device provided in the base station BS when the base station BS is installed.

The radio wave direction estimation unit 323 uses the three-dimensional coordinates of the current position acquired by the current position acquisition unit 322 and the three-dimensional coordinates of the base station position included in the radio wave transmitted by the base station BS to determine the elevation angle of the base station BS at the current position.

The antenna device 300 includes an antenna switching unit 390. The antenna switching unit 390 switches between a state in which the antenna used for communication is set to a horizontal polarization antenna 30 and a vertical polarization antenna 40, and a state in which the antenna used for communication is set to a horizontal polarization antenna 30 and a zenith antenna 50.

The antenna switching unit 390 has, for example, a configuration including a relay, for switching between a state in which the horizontal polarization antenna 30 and the vertical polarization antenna 40 are connected to the wireless circuit 321 and a state in which the horizontal polarization antenna 30 and the zenith antenna 50 are connected to the wireless circuit 321. The antenna switching unit 390 may be controlled by the wireless circuit 321.

When the radio wave direction estimation unit 323 estimates that the elevation angle at which the radio wave arrives is in the low elevation angle range, the antenna switching unit 390 sets the antennas used for communication to the horizontal polarization antenna 30 and the vertical polarization antenna 40. On the other hand, when the radio wave direction estimation unit 323 estimates that the elevation angle at which the radio wave arrives is in the high elevation angle range, the antenna switching unit 390 set the antennas used for communication to the horizontal polarization antenna 30 and the zenith antenna 50.

By switching the antennas used for communication in this way, it is possible to suppress deterioration of communication quality due to receiving radio waves with unnecessary antennas and reduce power consumption, as compared with always using three types of antennas.

Although the embodiments have been described above, the disclosed technology is not limited to the above-described embodiment, and the following modifications are included in the present disclosure, and various modifications can be made without departing from the spirit of the present disclosure.

(First Modification)

First modification is a modification of the fourth embodiment. The antenna switching unit 390 also has a function of operating the vertical polarization wave antenna 40 as an array antenna and scanning the beam direction.

In the first modification, the radio wave direction estimation unit 323 estimates the distance between the base station BS and the vehicle C, and based on this distance, estimates the elevation angle at which the radio wave from the base station BS arrives is in the low elevation range or the high elevation range. Specifically, if the estimated distance is longer than the preset long-distance threshold, it is estimated to be in the low elevation angle range, and if the estimated distance is less than or equal to the long-distance threshold, it is estimated to be in the high elevation angle range.

The distance is estimated based on the received power received with the radio wave transmitted by the base station BS. Since the frequency of radio waves transmitted and received is high, most of the radio waves that can be received are direct waves. Therefore, the distance can be estimated accurately based on the received power.

In order to estimate the distance from the received power, the directivity gain for each azimuth angle is measured and determined in advance, and stored in a predetermined storage unit. Further, the azimuth angle at which the radio wave arrives is determined by an arrival direction estimation method such as the MUSIC method, the ESPRESS method, and the beam former method. The azimuth angle means the direction of arrival of radio waves in the XY plane.

The directivity gain of the azimuth in which the base station BS exists is determined from the determined azimuth and the directional gain of each azimuth stored in the predetermined storage unit. When comparing the azimuth angle having a high directivity gain and the azimuth angle having a low directivity gain, the distance from the vehicle C to the base station BS is different even with the same received power.

Therefore, the relationship between the distance and the received power is determined based on the directivity gain of the azimuth angle in which the base station BS exists. For example, the relationship between the distance and the received power is set in advance for each directional gain, and the relationship corresponding to the directional gain determined this time is selected based on the directional gain determined this time with reference to the relationship between the distance and the received power for each directional gain set in advance. Alternatively, the relationship between the distance and the received power is set in advance with respect to the reference directivity gain. Then, based on the directional gain determined this time, the relationship between the distance set for the reference directional gain and the received power may be corrected.

The directivity gain may change not only with the azimuth but also with the elevation angle. However, since the base station BS needs to communicate with a moving body moving on the ground surface such as a road surface using the horizontal polarization wave and the vertical polarization wave, the installation height range of the base station BS is limited to some extent. Therefore, when the distance to the base station BS is long, it can be said that the elevation angle of the base station BS seen from the vehicle C is in the low elevation angle range. In the low elevation angle range, the change in directivity gain due to the change in elevation is small. Therefore, the relationship between the distance and the received power is determined almost only by the azimuth angle.

After determining the relationship between the distance and the received power, the distance between the vehicle C and the base station BS is estimated from the relationship and the received power of the radio wave received from the base station BS. Although the base station BS is installed at various heights, even if the fluctuation range of the installation height of the base station BS is taken into consideration, when the distance to the base station BS is long, it is considered that the base station BS is in the low elevation angle range. Therefore, if the distance between the vehicle C and the base station BS is equal to or greater than a preset long-distance threshold value, the elevation angle at which the radio wave from the base station BS arrives is set to the low elevation angle range. On the other hand, if the distance is shorter than the long-distance threshold value, the elevation angle at which the radio wave from the base station BS arrives is within the high elevation angle range.

(Second Modification)

Second modification is a modification of the fourth embodiment. The radio wave direction estimation unit 323 may estimate the azimuth angle and elevation angle of the base station BS based on the amount of change of the received power of the radio wave received from the base station BS that is sequentially received with respect to the moving distance. The directivity gain depends on the azimuth angle and the elevation angle. This means that the amount of change in the received power with respect to the travel distance differs depending on the azimuth and elevation angles in which the base station BS is present. Therefore, the azimuth angle and elevation angle of the base station BS can be estimated from the amount of change of the received power of the radio wave from the base station BS with respect to the moving distance.

(Third Modification)

In the fourth embodiment, the base station BS transmits a signal including the position where the base station BS is installed. On the other hand, in the third modification, the antenna device 300 acquires the data in the database storing the coordinates of the base station BS from the server or the like, and also acquires the ID of the base station BS acquired in the communication with the base station BS. Then, based on the ID of the base station BS, the coordinates of the base station BS stored in the server or the like are acquired.

<Fourth Modification>

In the embodiments, the substrate 60 is installed on the roof of the vehicle C. Alternatively, the substrate 60 may be attached to the windshield together with the cover.

<Fifth Modification>

In the embodiments, a plurality of vertical polarization antennas 40, which are 0th-order resonant antennas, are provided, and the distance between the plurality of vertical polarization antennas 40 is shorter than λ/2. Alternatively, the distance between the plurality of vertical polarization antennas 40 may be λ/2 or more.

<Sixth Modification>

When a plurality of horizontal polarization antennas 30 are distributed and arranged in the vehicle C, an antenna system may be used for each horizontal polarization antenna 30 with the directivity gain in the direction in which the other horizontal polarization antennas 30 are present is lowered, and the directivity gain in the direction in which the other horizontal polarization antennas 30 are not present is heightened.

<Seventh Modification>

In the embodiments, the zenith antenna 50 is a patch antenna. Alternatively, the zenith antenna 50, such as a horn antenna, may be another type of antenna.

<Eighth Modification>

In the embodiments, the orthogonal polarization wave is shown as the cross polarization wave. Alternatively, the cross-polarization waves that intersect at angles other than orthogonal may be used.

<Ninth Modification>

In the fourth embodiment, and the first to third modifications, a horizontal polarization antenna 150 may be used instead of the zenith antenna 50.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An antenna device for a mobile body, comprising:

a first antenna having a directional gain at a low elevation angle higher than the directional gain at a high elevation angle;

a second antenna having the directional gain at the high elevation angle higher than the first antenna, transmitting and receiving a radio wave having a vibration direction of an electric field intersecting with a radio wave transmitted and received by the first antenna, and communicable with a base station when the base station is disposed at the low elevation angle; and a third antenna having the directional gain at the high elevation angle higher than the first antenna, and transmitting and receiving a radio wave having a vibration direction of an electric field intersecting with the radio wave transmitted and received by the second antenna, wherein:

the first antenna is an antenna that transmits and receives a vertically polarized wave and has a lower directivity gain in a vertical direction than a horizontal direction;

the third antenna is a patch antenna;

the first antenna is a zeroth order resonant antenna having a flat plate-shaped conductor plate, a ground parallel to the conductor plate, and a short-circuit pin connecting the conductor plate and the ground;

the zeroth order resonant antenna is arranged on a same layer as the patch antenna;

the zeroth order resonant antenna includes a plurality of zeroth order resonant antenna elements; and the patch antenna is arranged on a same substrate as the plurality of zeroth order resonant antenna elements and is arranged at a position sandwiched between the plurality of zeroth order resonant antenna elements.

2. The antenna device according to claim 1, wherein:

a whole of the patch antenna is sandwiched between the plurality of zeroth order resonant antenna elements.

3. The antenna device according to claim 1, wherein:

the antenna device is mounted on a vehicle;

the second antenna includes a plurality of second antenna elements; and at least two of the plurality of second antenna elements are separated by a half of a wavelength or more of the radio wave transmitted and received by the second antenna in a front-rear direction of the vehicle.

4. The antenna device according to claim 1, wherein:

the antenna device is mounted on a vehicle;

the second antenna includes a plurality of second antenna elements; and at least two of the plurality of second antenna elements are separated by a half of a wavelength or more of the radio wave transmitted and received by the second antenna in a width direction of the vehicle.

5. The antenna device according to claim 1, wherein:

the first antenna, the second antenna, and the third antenna are arranged on a same substrate.

6. The antenna device according to claim 1, further comprising:

a radio wave direction estimation unit that estimates whether the elevation angle at which the radio wave transmitted by the base station arrives is in a low elevation angle range or a high elevation angle range; and an antenna switching unit that switches an antenna for communication to the first antenna and the second antenna when the radio wave direction estimation unit estimates that the elevation angle at which the radio wave arrives is in the low elevation angle range, and switches the antenna for communication to the second antenna and the third antenna when the radio wave direction estimation unit estimates that the elevation angle at which the radio wave arrives is in the high elevation angle range.

7. The antenna device according to claim 6, wherein:

the radio wave direction estimation unit estimates the elevation angle at which the radio wave from the base station arrives, based on coordinates of the base station and coordinates indicating a current position of a moving body.

8. The antenna device according to claim 6, wherein:

the radio wave direction estimation unit estimates a distance between the base station and a moving body, and estimates that the elevation angle is in the low elevation angle range when the distance is longer than a predetermined long-distance threshold value.

* * * * *